(12) United States Patent
Sfez (10) Patent No.: US 12,488,230 B2
(45) Date of Patent: Dec. 2, 2025

(54) METHOD AND APPARATUS FOR PERFORMING NEURAL NETWORKS COMPUTATION USING OPTICAL ELEMENTS

(71) Applicant: Soreq Nuclear Research Center, Yavne (IL)

(72) Inventor: Bruno Sfez, Yavne (IL)

(73) Assignee: Soreq Nuclear Research Center, Nahal Soreq (IL)

(*) Notice: Subject to any disclaimer, the term of this patent is extended or adjusted under 35 U.S.C. 154(b) by 420 days.

(21) Appl. No.: 18/251,588

(22) PCT Filed: Nov. 3, 2021

(86) PCT No.: PCT/IB2021/060176
§ 371 (c)(1),
(2) Date: May 3, 2023

(87) PCT Pub. No.: WO2022/097040
PCT Pub. Date: May 12, 2022

(65) Prior Publication Data
US 2024/0005142 A1 Jan. 4, 2024

Related U.S. Application Data

(60) Provisional application No. 63/109,388, filed on Nov. 4, 2020.

(51) Int. Cl.
G06N 3/067 (2006.01)
G06N 3/048 (2023.01)
H01S 3/094 (2006.01)
H01S 3/102 (2006.01)

(52) U.S. Cl.
CPC ............. *G06N 3/067* (2013.01); *G06N 3/048* (2023.01); *H01S 3/094053* (2013.01); *H01S 3/1022* (2013.01)

(58) Field of Classification Search
None
See application file for complete search history.

(56) References Cited

U.S. PATENT DOCUMENTS

| | | | |
|---|---|---|---|
| 6,816,515 B1 | 11/2004 | Yun | |
| 8,441,718 B2* | 5/2013 | Mead | H01S 3/302 |
| | | | 372/102 |
| 2004/0021932 A1 | 2/2004 | Maurer | |
| 2005/0265679 A1 | 12/2005 | Liu | |
| 2011/0122482 A1* | 5/2011 | Mead | H01S 3/094046 |
| | | | 359/345 |
| 2014/0016184 A1 | 1/2014 | Laroche | |

(Continued)

OTHER PUBLICATIONS

PCT Search Report and Written Opinion PCT/IB2021/060176, Feb. 28, 2022.

*Primary Examiner* — Phu Vu
(74) *Attorney, Agent, or Firm* — Dekel Patent Ltd.; David Klein (57) ABSTRACT

A method for performing a nonlinear optical operation includes pumping a laser with an optical signal at a pump wavelength and pumping the laser with an electronic or optical bias that acts as a hyperparameter, filtering out optical output at the pump wavelength so that only light at a lasing wavelength exits the laser, and collecting light exiting the laser for further optical processing or detection.

12 Claims, 7 Drawing Sheets

(56) References Cited

U.S. PATENT DOCUMENTS

2015/0331672 A1 11/2015 Kabushiki
2017/0012705 A1 1/2017 Vahala et al.
2021/0050702 A1* 2/2021 Wang .................... H01S 3/0675

* cited by examiner

Figure 1

PRIOR ART

METHOD AND APPARATUS FOR PERFORMING NEURAL NETWORKS COMPUTATION USING OPTICAL ELEMENTS

FIELD OF THE INVENTION

The present invention relates generally to neural networks and particularly to neural networks computation using optical elements.

BACKGROUND OF THE INVENTION

Random algorithms are playing a more and more important role in machine learning tools since it can considerably reduce processing time. One approach is to increase the dimensionality if the problem in order to make it separable by a hyperplan (Rahimi 2007), and the second is to use random projections from a high dimensional space to a low dimensional space while keeping key properties of the data, such as the distance between the data points (Rahimi 2008). Reservoir computing is a sub-field of neural networks that aims at increasing the dimensionality of the initial problem in order to increase its separability properties [Tanaka 2019]. Physical reservoir computing uses analog physical systems in order to generate this reservoir, instead of digital computing means. The objective is to reduce the latency time caused by the conventional Turing-Von Neuman architecture and process a massive data flow through parallelism. One of the preferred physical implementation of such reservoir computing systems is the optical implementation where scattering plays a central role for creating the random neural network. This presents several advantages: huge number of connected neurons, fast processing limited by the slowest relaxation time of the physical system and relatively low-cost implementation. Therefore, this technology is particularly adapted to real-time, high data flow computing. Major obstacles to actual implementation of reservoir based systems are the fact that both linear and nonlinear electronic based computing operations must be performed at the end of the neuronal process, which limits the band-pass of the system.

Previous Work

The concept of reservoir computing using random neural networks has been described for example in [Lukosevicius 2012]. The concept can be summarized as follows. By reference to FIG. 1, the computing unit consists in an optical input layer 101, a random network of interactive centers (neurons) 102, an output layer that performs a nonlinear process on the signal 103 and a final layer that performs a linear operation on the signal 104. For training purpose or monitoring an error signal 105 can be generated and fed back to the input layer.

Figure 1:
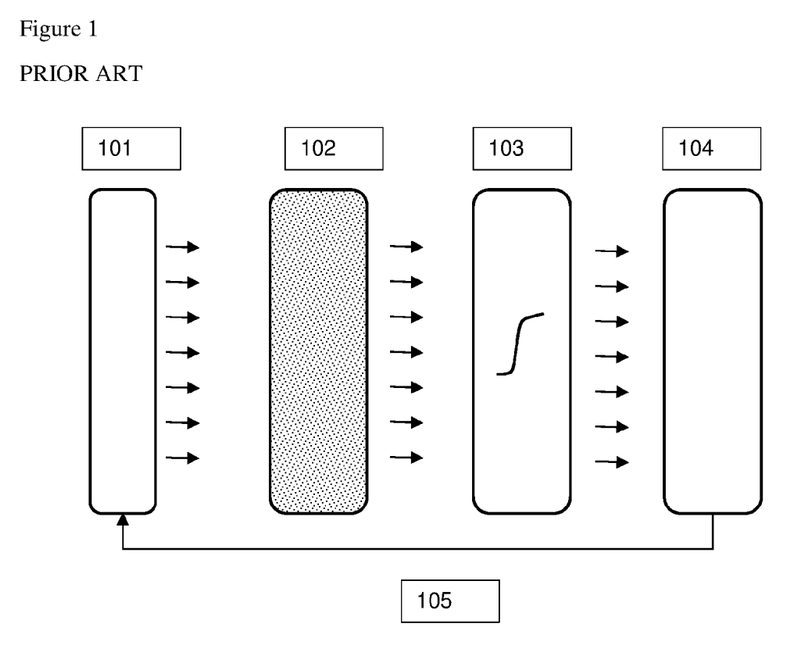

The mechanism can be formalized by the following equations:

An input U is fed in at time t in the system $$X(t+\delta t) = F_{NL}(W \cdot X(t) + V \cdot U(t)) \quad \text{Equation 1}$$

$$Y(t) = W^{OUT} \cdot X(t) \quad \text{Equation 2}$$

where X is a time dependent vector that describes the state of the neural network 102, U the time dependent input, V the time independent interaction of the input with the network, W a time independent random matrix that describes the network weights and $F_{NL}$ a nonlinear function that describes the nonlinear process 103. The linear operation is performed by a linear operator $W^{out}$.

This concept has been applied to different electronic or physical media [Tanaka 2019]. In particular, it has been implemented with optical means [Dong 2018]. In that case, U represent optical waves, V and W the scattering agents in an optically (elastically) scattering medium, the nonlinear operator is generally obtained through the nonlinear response of the detector (which measures the square modulus of the electrical field) and computer processing, and the linear operation 104 is performed by the computer [Rafayelyan 2020].

For example, Scofield [Scofield 2020] describes a system where the source U is an array of modulated optical waves generated by a common laser, the scattering medium is a multimode waveguide where the modes (neurons) X interact through random fluctuations of the waveguide material and shape, which are then characterized by the scattering matrices V and W. The nonlinear operation is then performed by electronic means (optical modulators, detectors and/or amplifiers). Another implementation [Rafayelyan 2020] uses coherent free-space optics. W and V represents the scattering matrix of the medium configuration. The output, a speckle pattern, is detected by a camera and the nonlinear operation is performed in the computer. The data input U is programed on a phase-only liquid crystal light modulator.

Although these implementations of the photonic computing reservoir can handle a very large data set size as well as fast random operation, they are limited in two ways: first, the nonlinear operation is not optimal: it is determined by the detector response ($L_2$ norm) which is not the optimal nonlinear response (in contrast with the rectified linear unit (ReLU) response [Gloro 2011] for example). Second, the linear operation performed by $W^{out}$, which is a critical part of the process, is performed by electronic means, which therefore constitutes a major bottleneck both for the size and the speed.

SUMMARY

This invention provides a photonic device and method of its operation that can provide random reservoir properties with tunable hyper-parameters such as the nonlinearity response together with deterministic linear operations. The all-optical implementation allows low latency and high computational speed. Three possible physical implementations of this invention are presented.

The invention provides a remedy to the problematic bottlenecks of the prior art.

BRIEF DESCRIPTION OF THE DRAWINGS

The present invention will be understood and appreciated more fully from the following detailed description taken in conjunction with the drawings in which:

FIG. 1 is a processing flowchart of an all-optical reservoir computation of the prior art. Modulated light array 101 is coupled to an elastically linear scattering optical medium 102. Light exits the scattering medium and is then coupled into a nonlinear optical element 103 that performs a ReLU operation. Following this operation light is coupled into an element 104 that performs a linear operation. This operation is trained beforehand so that the linear operation is always the same. Optionally signal exiting 104 is coupled back as an input in 101 through a side optical path 105.

FIG. 3 is an illustration of an optical implementation of the ReLU nonlinear operation, in accordance with an embodiment of the invention. Input light 303 is coupled into p lasers and each beam is pumping a laser cavity. An auxiliary source 302 is also pumping these lasers and introduces a bias. Light intensity exiting the p lasers is exhibiting a ReLU response as a function of the input light intensities.

FIG. 5 is an illustration of an optical implementation of the output linear operation, in accordance with an embodiment of the invention. The Stanford scheme is based on an input optical signal array (vector) 501 that is spread over a modulating screen 503 using cylindrical optics 502. Light is then concentrated on an array of detectors 505 using a second cylindrical optics assembly 504 at 90 degrees orientation from the first optics. The programing of the screen 503 is performed once and is then not time dependent.

FIG. 6 is an illustration of an implementation of the invention on a semiconductor platform. Light exiting a semiconductor diode is split into q channels and is coupled into an array of q modulators or semiconductor optical amplifiers 602. Light exiting 602 is coupled into a scattering medium 603 composed of pillars that are lithographically positioned into a random pattern. These pillars are embedded within a polymer material for proper optical guiding within the element. Following the pillar section is an array of p single mode laser waveguides 604 that are designed so that the light wavelength of the laser 601 is suitable for optical pumping of these lasers. An electrical bias is added so that these lasers are operating slightly below threshold when 601 is off. The output power of 604 exhibits a ReLU response as a function of the input power. Light exiting 604 is then coupled into a linear planar optical operator 605 similar to what is described in [Miller 2015]. The output is detected by an array of detectors. It should be noted that 602, 603, 604 and 605 can be aligned using pick and place technique as long as 605 is trained after the assembly.

FIG. 7 is an illustration of an implementation of the invention on an optical fibers platform. An array of q modulated laser light sources 701 is coupled into q single mode optical fibers 702 that are bundled together and attached (physical contact) to a multimode fiber 703. 703 acts as the scattering module. A bundle of p single-mode fiber lasers 707 is also attached to the other end of the multimode fiber. Each fiber laser is pumped by light exiting the multimode fiber and by an additional pumping source 704 that acts as a bias. 704 is coupled to the fiber laser using standard techniques (end-pumping, side pumping etc). Light exiting 707 is then processed by a linear optical processor such as the one described in FIG. 5 and detected by an array of p detectors 706.

DETAILED DESCRIPTION

A generic, universal device is first described, which can be used as the building block of photonic reservoir computing platforms. In order to better appreciate the different features of the device, the desired mode of operation of such a device is now described.

In equations 1 and 2 above, four types of operations are performed: W and V perform random scattering, $F_{NL}$ a nonlinear operation and $W_{OUT}$ the final linear operation. W and V are very simply implemented in optics: any scattering medium will provide these operations. This is probably the simplest operation that is performed by optics. Any optical system can provide scattering: multimode waveguide, white paint, turbulent water or atmosphere and so on. The nice feature of scattering, in addition to its implementation, is that it provides a huge spatial band-width, and from a neural network viewpoint, a huge interacting network of neurons.

However, $F_{NL}$ and $W^{OUT}$ are much more difficult to implement in an all-optical way, and is usually a neglected aspect of the photonic implementation, and therefore constitute a major bottleneck. "All-optical processing" means a set of processes whose speed is limited by purely optical interactions only. The different devices involved in the process can be set by electronics means, for example in the training phase, but are kept static during the all-optical processing.

What is first described is how the WOUT operation can be performed directly in the optical platform, without requiring electronic computations.

Any linear operation can be performed using matrices operations. For example, it may be desired to perform the multiplication of a data array B (of dimensions q×n) by a fixed array A (of dimensions p×q) such that C=AB (C has dimensions p×n).

Consider that B is encoded in space and time: the rows of B are encoded in space (each row is a specific spatial input) and the columns of B are encoded in time (each element of B is a time light pulse). The light pulse can be coded in amplitude, phase or polarization.

The value of an element $c_{ij}$ of C is given by $$c_{ij} = \sum_{k=1}^{q} a_{ik} b_{kj} \qquad \text{Equation 3}$$

Figure 2:
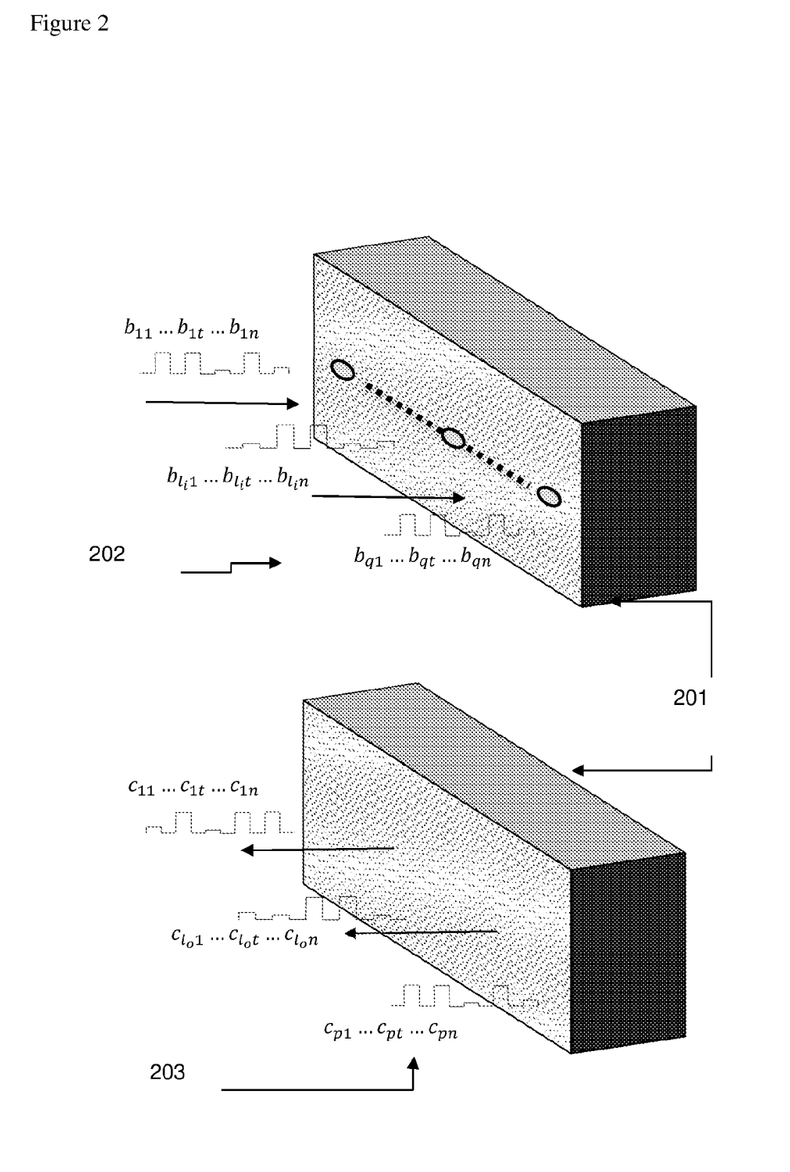
FIG. 2 is an illustration of an optical implementation of a random matrix operation, in accordance with an embodiment of the invention. 201 is an optically elastic scattering medium (top and bottom: input and output sides). q channels of modulated light 202 are coupled into the medium and p channels 203 are exiting the medium. The linear transformation that is operated in the scattering medium is similar to the product of the input vector by a random matrix.

Reference is now made to FIG. 2. In this figure, an optical elastically scattering medium 201 is considered. Light is coupled in this medium through q locations. At each location (1 to q) a temporal train of pulses is coupled in. One names $b_{l_i,t}$ a specific pulse intensity at time t and at a specific location $l_i$. Similarly, one defines on the other side of the medium p locations (1 to p) where light is coupled out and number these locations 1 to p. One names $c_{l_o,t}$ a specific pulse intensity at time t and at a specific location $l_o$. Now one considers the effect of the scattering medium 201. This medium scatters light in all the directions and after a distance 1* light has equal chance to propagate in any direction (memory loss). So by carefully designing this medium, light that is coupled at time t in at a location $b_{l_i}$ will couple out at a location $c_{l_o}$ with a certain probability $a_{l_o l_i}$. Light that is coupled out from the location $c_{l_o}$ is the coherent sum of the contributions of light coming from all the different inputs $b_{l_i}$. This is true at each time t, so one can evaluate the contribution of all the different inputs $b_{l_i,t}$ at time t to the output $c_{l_o,t}$ at location $l_o$ as $$c_{l_o,t} = \sum_{l_i=1}^{q} a_{l_o l_i} b_{l_i,t} \qquad \text{Equation 4}$$

Therefore the effect of the scattering medium is to multiply the time dependent array B by a constant matrix A. The V and W matrices introduced above are such matrices albeit with random coefficients.

The output of the scattering medium is represented therefore by the algebraic operation W·X(t)+V·U(t). This output is a speckle pattern. Light exiting the medium can be coupled in a waveguides array, whose intensity will vary according to the speckle pattern. One considers that the pattern couples into p different channels (such as waveguides) and is represented by a vector J whose elements are the output (intensity of field) of each channel J(t)=W·X(t)+V·U(t). Note that it is possible to position a polarizer at the exit of the scattering medium in order to improve the speckle contrast.

One now turns to the nonlinear transformation, an important element of the reservoir computing approach. A very popular nonlinear transformation is the rectified linear unit (ReLU) transformation. The description that follows explains how to implement it in an all-optical fashion.

An intrinsic nonlinear phenomenon in optics is the lasing process. Below the threshold no light is emitted (except luminescence) and above it laser light is emitted. One considers the following nonlinear process: the signal that must be transformed by the nonlinear process is initially carried by laser light at wavelength $\lambda_P$. This signal then propagates in a lasing cavity whose pumping wavelength spectral range includes the wavelength $\lambda_P$. If the signal intensity is below the lasing pumping threshold, then no lasing occurs and the output of the laser at the lasing wavelength $\lambda_L$ is virtually zero. If the signal intensity is above the lasing threshold, then lasing occurs and signal at the lasing wavelength $\lambda_L$ is emitted. Therefore, a ReLU-like nonlinear operation is performed.

Figure 3:
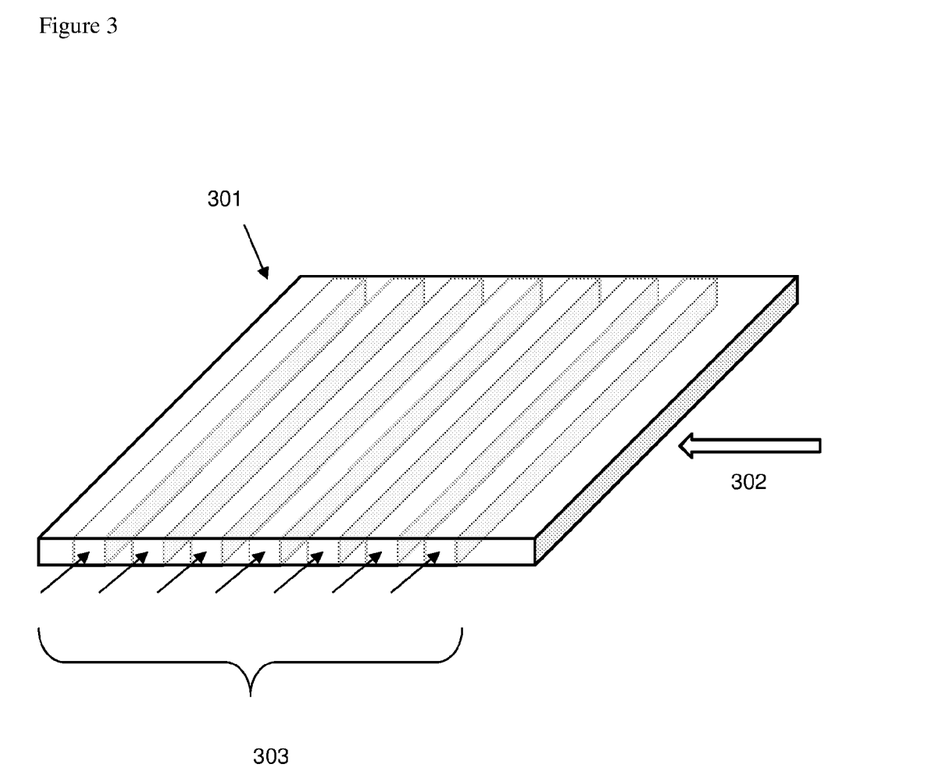

Reference is now made to FIG. 3. A medium 301 includes a background transparent material within which is embedded a linear array of waveguides which are doped with a lasing material whose optical pumping spectral region overlaps with the light wavelength lambdas. An optional pump light source 302 is coupled in these waveguides in order to provide an optical bias. Light at wavelength $\lambda_P$ emitted by the scattering medium is coupled into the waveguides 303. These waveguides are coated both sides with a dielectric mirror or Bragg grating adapted to the lasing at $\lambda_L$ and transparent to the wavelength $\lambda_P$. If the combined power of both the signal and the bias at wavelength $\lambda_P$ exceeds the lasing threshold, the waveguides start lasing.

A filter that blocks the pump wavelength and transmits the lasing wavelength is positioned at the exit of the waveguide array so that only light at $\lambda_L$ is transmitted. If the waveguides are single mode waveguides, light emitted by each waveguide is single-mode.

Figure 4:
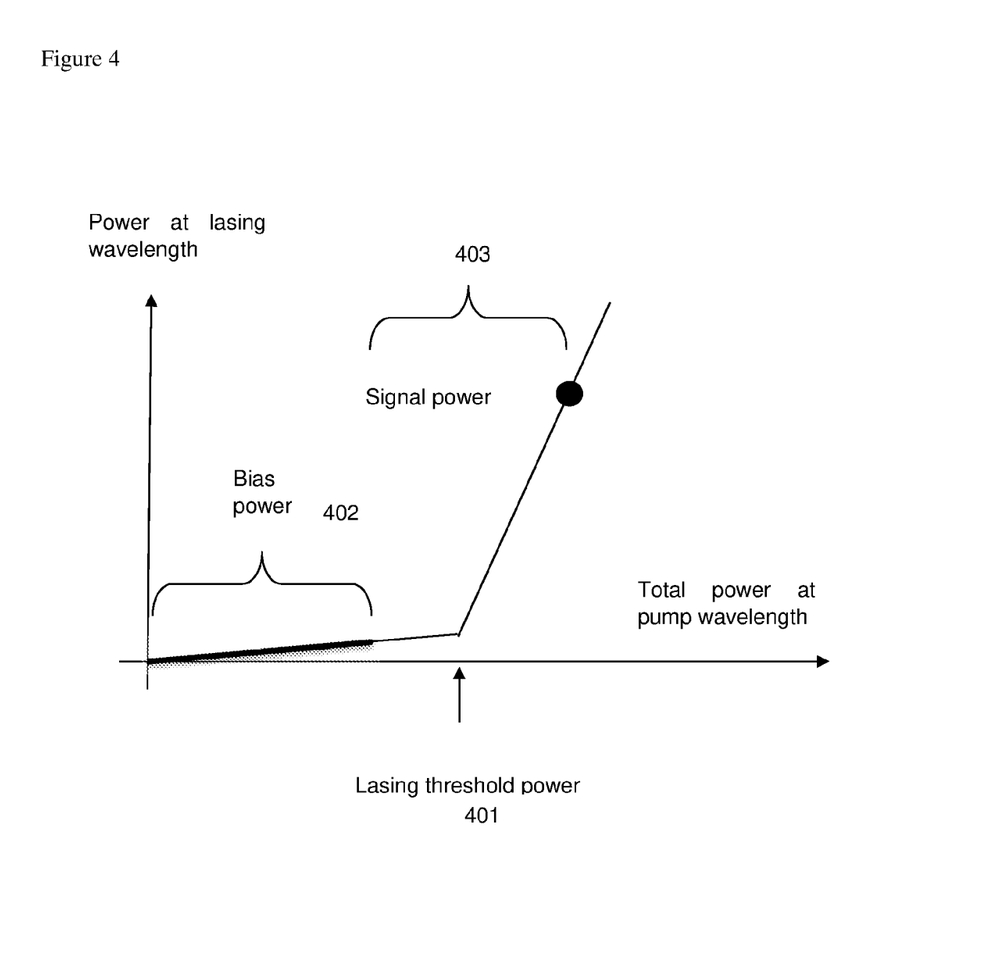
FIG. 4 is a graphical illustration of the role of the laser bias of the implementation of FIG. 3. Each individual laser in FIG. 3 presents a lasing threshold 401. Lasing is obtained when the sum of the bias power 402 and signal power 403 is higher than the threshold.

The action of this system (the nonlinear element), is described in FIG. 4. When the combined power of the signal and the bias is smaller than the lasing threshold power, light that exits the waveguides is spontaneous emission, and its intensity is very low. Above the threshold lasing occurs, leading to a linear growth with the signal power. The threshold position can be modified by changing the bias power. The ReLU operation is therefore performed with a tunable hyper-parameter: the bias power. It should be noted that another critical operation is realized in the process: the coherence of the initial laser is lost and each waveguide outputs are mutually incoherent. This is critical for further processing.

Figure 5:
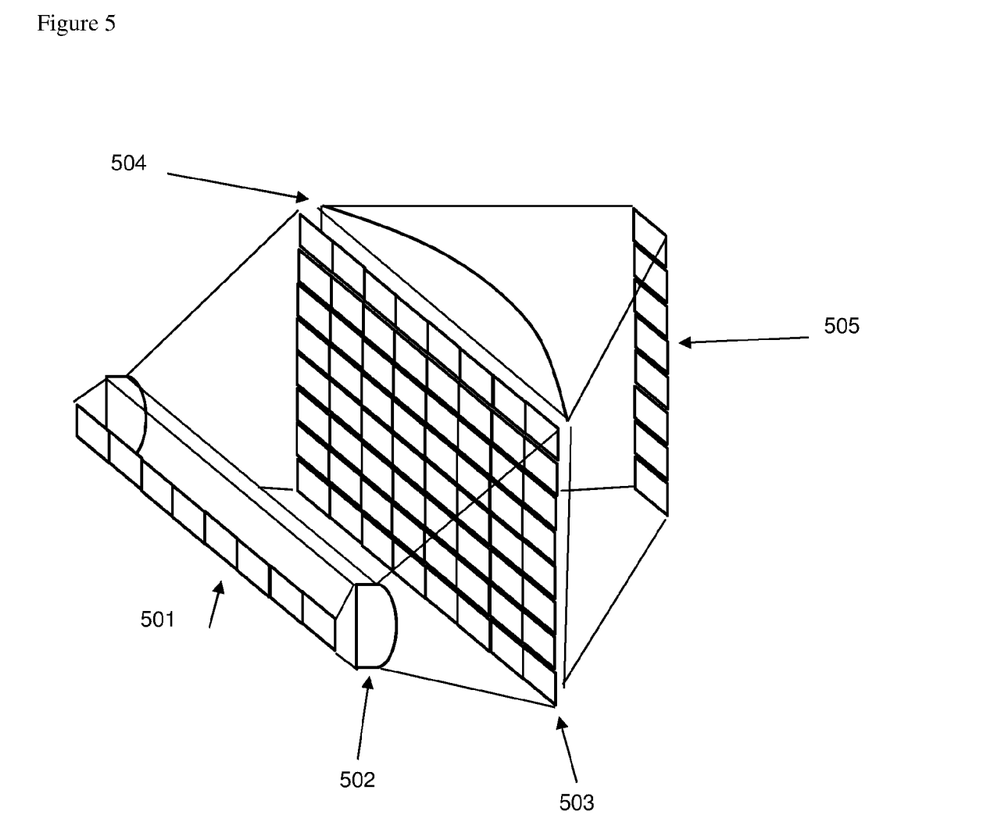
Figure 6:
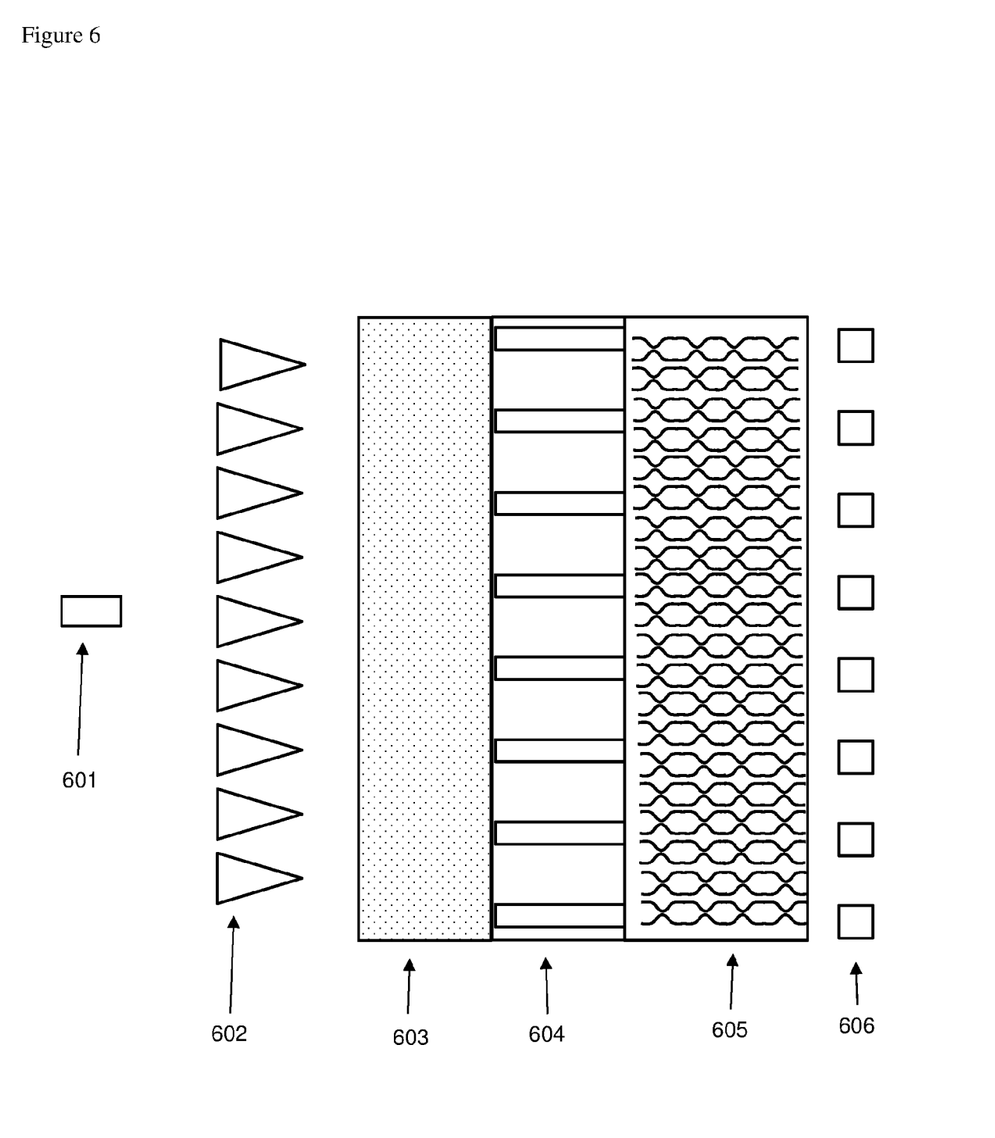
Figure 7:
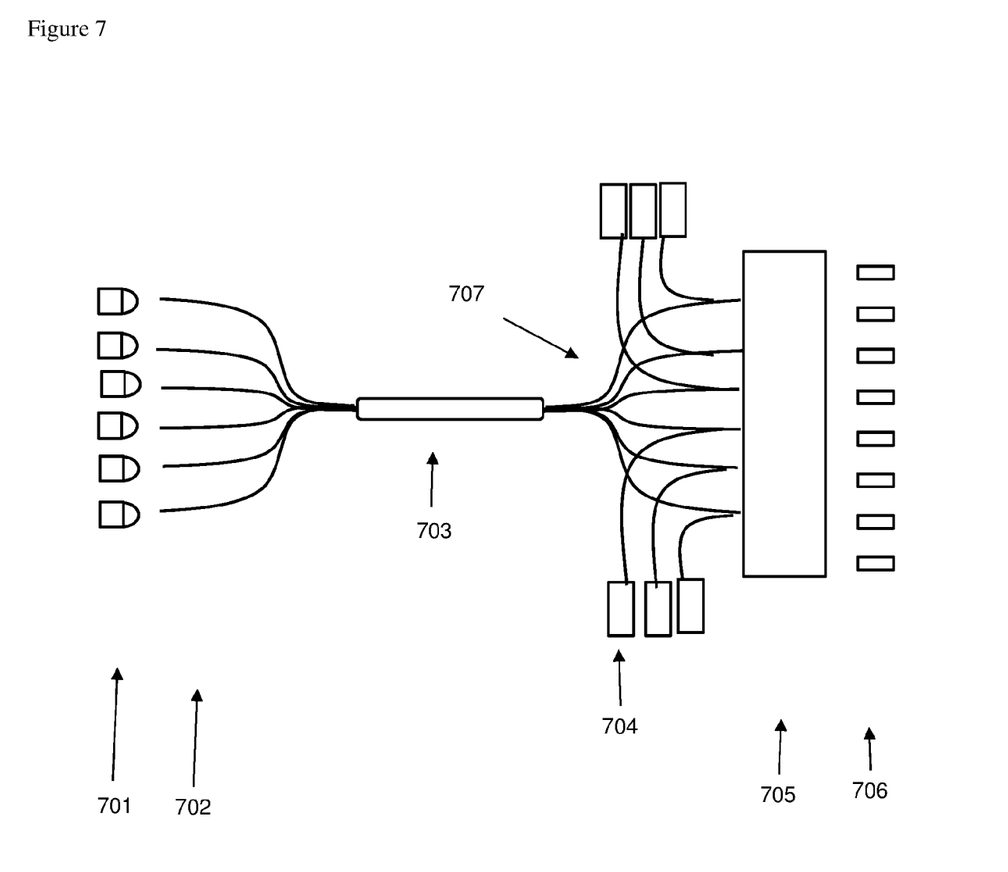

Light that exits the nonlinear transformer is then processed via a linear transformation. Such a transformation can be expressed by a matrix product, similarly to the random scattering process above. In order to perform this product, it is possible to use the so-called Stanford Vector Matrix Multiplier [Goodman 78]. The following explanations are with regards to FIG. 5. Light exiting the waveguides array is projected over a modulating screen using adequate optics. This screen can be a liquid crystal screen performing analog amplitude modulation, or a digital light processing (DLP) unit based on micro-mirrors array performing binary operations. This modulation effect can be expressed by a field transmission matrix $A=\{a_{ij}\}_{i,j}$. The physical desired effect is to project the row of waveguides onto the screen so that for each waveguide j, the output field is transformed into a column of identical values $s_j$ ($X_j = \|s_j\|^2$ is the corresponding light intensity) that is projected on the screen. Each light signal is modulated by the screen pixel, so that immediately after the screen, the light field amplitude is $s_j a_{ij}$, for each signal $s_j$ and screen column $\{a_{ij}\}_i$. Using adequate optics, light that exits each individual row is focused onto a single light detecting pixel i, generating a signal $y_i$. There are as many detectors as rows in the screen so that each screen row is similarly focused on a different detecting pixel. Therefore the field reaching each detecting pixel is $$\sum_{i=1}^{n} s_i a_{ij}$$

and the detected intensity is $$y_j = \left\| \sum_{i=1}^{n} s_i a_{ij} \right\|^2.$$

Because of the mutual incoherence between the signals $s_i$, there is no interference term so that finally $$y_j = \sum_{i=1}^{n} \|s_i a_{ij}\|^2 = \sum_{i=1}^{n} \|s_i\|^2 \|a_{ij}\|^2 = \sum_{i=1}^{n} X_j W_{ij}^{OUT} \text{ where } W_{ij}^{OUT} = \|a_{ij}\|^2.$$

It should be noted that a phase term can be added if phase modulation is required. The elements $W_{ij}^{OUT}$ are fixed (for example defined through a training procedure), while the signal values $X_j$ are time dependent. The resulting data are therefore time dependent. The final operation is therefore $Y(t)=W^{OUT} \cdot X(t)$.

An alternative way to perform this linear operation is to use an assembly of Mach-Zender interferometers, according to the method explained by [Miller 2015]. The advantage of the method is that it is planar, so can be integrated into a planar chip together with the other components.

In conclusion, the complete process defined in equations 1 and 2 is performed optically. The electronics elements are all time independent, therefore generating no latency. The fixed values of the settings of the electronic-driven components (the bias intensity of the pump laser, the values of the transmission matrix elements etc) are hyper-parameters that are determined through training. The throughput of the data is time-limited by the detectors response time. Except for the detectors, the latency of the system is limited by the light propagation time from the main laser to the detectors and by the lasing process response time. This time can be as small as a few femtoseconds (dyes, quantum dots, lasing materials, rare earth and others).

Examples of Implementation of this Method

Solgel Platform

The solgel platform presents advantages of wide material and processes flexibility. A continuous wave or pulsed laser is collimated in 2 dimensions and is passing through an array of modulators (for example lithium niobate modulators) that create the time dependent light input vector I(t). After modulation the beams array is coupled in the scattering medium. The scattering medium is made of a thin (1 to 100 microns) film of solgel material mixed with scatterers such as titanate beads. The length and beads concentration of the medium should be such that light is completely scattered (loss of memory) but that the speckle contrast is maximal (no coherence loss). In order to avoid side scattered losses, mirrors can be put around this medium. Following this element an array of single mode waveguides from solgel material doped with lasing material (such as lasing dye, quantum dots, rare earth) is positioned (no precise positioning is necessary). This element is pumped by a combination of the light exiting the scattering component (in the waveguide) and an additional pump beam, as shown in FIG. 3, which acts as a bias. A spectral filter that removes the pump light is positioned after this element. Light exiting this array is then projected to the matrix multiplication element (FIG. 5). The output is detected by an array of detectors, digitalized and processed.

Semiconductors Integrated Circuit Platform

A semiconductor platform presents the advantage of integrated circuit and mass production. The assumption is that the semiconductor platform is based on III-V elements such as GaAs, InGaAs etc. The circuit is composed of a laser source that is split into an array of optical amplitude modulators or semiconductors optical amplifiers. Light is then coupled to a two-dimensional scattering medium. This medium is obtained for example by etching a two dimensional random array of pillars and then filling the inter-pillar space with a transparent material of lower index, such as a polymer. Light exiting this medium is then coupling in a one dimensional array of semiconductor diode lasers. Each such laser is then optically pumped by light exiting the scattering medium and electrically pumped below the lasing threshold. The laser ends are transparent for the pump wavelength and partially reflective for the lasing wavelength, therefore generating a ReLU nonlinear function. The signal is then processed by an array of Mach-Zender Interferometers, such as described in [Miller 2015] that provide a linear transformation to the data.

Fibers Platform

The fiber platform enables integration of the invention in a communication network and provides on-line, in-memory computation at extremely fast rates. Optical signal at the pump wavelength is coupled into single-mode fibers that are further grouped as a bundle or as a multicore fiber. A multimode fiber acts as a scattering medium. Light exiting the single mode fibers bundle is coupled to the multimode fiber by fusing the bundle to the input facet of the multimode fiber. A bundle of single mode fiber lasers is fused on the other side of the multimode fiber. These fibers are optically pumped by both the output of the multimode fiber and an additional pump laser that pumps all the fibers together or several pump lasers that pump each fiber individually (bias). Light intensity exiting these fiber lasers therefore presents a ReLU response as a function of the input light intensity. Light exiting the fiber lasers is then coupled to a linear optical operator (such as the Stanford system described above, FIG. 5).

REFERENCES

Dong et al 2018, *"Proceeding of the IEEE Workshop on Statistical Signal Processing (SSP)"*, 2018, Page 448-452

Glorot et al 2011, *"Deep sparse rectifier neural networks"*, Proc 14$^{th}$ International Conference on Artificial Intelligence and Statistics 315-323 (2011)

Goodman et al 1978, *"Fully parallel, high-speed incoherent optical method for performing discrete Fourier transforms"*, OPTICS LETTERS January 1978/Vol. 2, No. 1

Lukosevicius et al 2012: *"Reservoir computing trends"* Kunst Intell 26:3656-371, 2012

Miller 2015: *"Perfect optics with imperfect components"*, Optica Vol 2, No 8, 747, 2015

Rafayelyan et al 2020, *"Large-Scale Optical Reservoir Computing for Spatiotemporal Chaotic Systems Prediction"*, arXiv:2001.09131v1 (2020).

Rahimi et al 2007: *"Random features for large-scale Kernel machines"*

Rahimi et al 2008: *"Weighted sums of random kitchen sinks: replacing minimization with randomization in learning"*

Scofield et al 2020: "Reservoir computing operations using multi-mode photonics integrated circuits", U.S. Pat. No. 10,627,849 B1 (Apr. 21, 2020)

Tanaka et al 2019: *"Recent advances in physical reservoir computing: A review"*, Neural Networks 115 (2019) 100-123

The invention claimed is:

1. An apparatus for fast optical computing comprising:
   an array of laser sources at wavelength $\lambda_P$;
   an optically scattering medium;
   an array of lasers optically pumpable at wavelength $\lambda_P$ simultaneously by two different and independent pumping sources;
   an optical filter that filters out light at wavelength $\lambda_P$;
   an optical processing unit; and
   an array of detectors.

2. The apparatus according to claim 1, wherein the array of laser sources is a continuous wave or pulsed laser which is collimated in two dimensions and passes through an array of modulators, wherein the scattering medium comprises solgel material.

3. The apparatus according to claim 1, wherein the array of lasers is an array of single mode waveguides from solgel material doped with lasing material.

4. The apparatus according to claim 2, wherein the array of lasers is an array of single mode waveguides from said solgel material doped with lasing material.

5. The apparatus according to claim 1, wherein the array of laser sources is a semiconductor diode that is split and coupled into an array of optical modulators or amplifiers, wherein the scattering medium is made of an array of pillars embedded in a polymer medium, and wherein the array of lasers is an array of single mode waveguides that are optically pumped by light exiting the scattering medium and simultaneously electrically or optically pumped by an external source.

6. The apparatus according to claim 1, wherein the array of laser sources is coupled into an array of single mode fibers that are bundled together, wherein the scattering medium is a multimode fiber, and wherein the array of lasers is an array of fiber lasers that are simultaneously pumped by the signal exiting the scattering medium and one or several pumping lasers.

7. The apparatus according to claim 1, wherein at least one of said array of lasers is pumped by at least one of said pumping sources with an optical signal at said pump wavelength $\lambda_P$ and with an electronic or optical bias that acts as a hyperparameter, and said optical filter filters out optical output at said pump wavelength $\lambda_P$ so that only light at a lasing wavelength exits said at least one of said array of lasers, and said optical processing unit collects light exiting the laser for further optical processing or detection.

8. The apparatus according to claim 7, wherein said optical processing comprises a rectified linear unit (ReLU) operation.

9. The apparatus according to claim 8, wherein said ReLU operation is performed by an all-optical processing unit comprising an array of temporally modulated laser sources, an optically scattering medium, a linear optical operator and an array of detectors.

10. A method for performing a nonlinear optical operation, comprising:
   pumping a laser with an optical signal at a pump wavelength and pumping said laser with an electronic or optical bias that acts as a hyperparameter;
   filtering out optical output at the pump wavelength so that only light at a lasing wavelength exits the laser; and
   collecting light exiting the laser for further optical processing or detection.

11. The method according to claim 10, wherein said optical processing comprises a rectified linear unit (ReLU) operation.

12. The method according to claim 11, wherein said ReLU operation is performed by an all-optical processing unit comprising an array of temporally modulated laser sources, an optically scattering medium, a linear optical operator and an array of detectors.

* * * * *